United States Patent
Herrmann

(10) Patent No.: US 6,229,471 B1
(45) Date of Patent: May 8, 2001

(54) METHOD FOR DETECTING A PULSE-USABLE SYSTEM

(75) Inventor: Franz Herrmann, Öpfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/266,004

(22) Filed: Mar. 11, 1999

(30) Foreign Application Priority Data

Mar. 12, 1998 (DE) .............................................. 198 10 695

(51) Int. Cl.[7] .............................. H03M 1/60; H03M 1/48
(52) U.S. Cl. ........................................... 341/157; 341/111
(58) Field of Search .................................... 341/155, 157, 341/111; 375/285, 200

(56) References Cited

U.S. PATENT DOCUMENTS 5,907,298 * 5/1999 Kiriyama et al. .................... 341/111

* cited by examiner

Primary Examiner—Peguy Jeanpierre
(74) Attorney, Agent, or Firm—Venable; Norman N. Kunitz

(57) ABSTRACT

A method for detecting a pulsed usable signal that particularly includes the highest frequencies and possesses a poor signal/noise ratio. First an analog, frequency-limited input signal that corresponds to the usable signal to be detected is formed from the analog input signal through analog filtering. This signal is then converted into a series of digital phase values through a phase/digital converter. First phase difference values are formed from these digital phase values by parallel or serial signal processing, and second phase difference valves are formed from these first difference values. Absolute values of the second difference values are then supplied via a digital low-pass filter to a comparator having hysteresis. There, an output signal that can be digitally utilized and corresponds to the pulsed usable signal is formed by predeterminable threshold values.

5 Claims, 4 Drawing Sheets

METHOD FOR DETECTING A PULSE-USABLE SYSTEM

BACKGROUND OF THE INVENTION

The invention is based on a method for detecting a pulse-usable signal wherein a frequency-limited input signal is generated from an analog input signal through filtering, which is adapted to the useful signal to be detected, and the useful signal is determined from the frequency-limited input signal by an integration operation.

In electrical engineering, particularly in telecommunications, it is often necessary to detect a pulse-usable signal contained in an extremely noisy, analog electrical input signal in order to evaluate the pulse-usable signal. An obvious solution is to first filter the input signal with a low-pass filter or a band-pass filter whose limit frequencies are adapted to the bandwidth of the usable signal. The result of this process is an input signal that is limited in frequency, but in which it is still frequently impossible to detect the usable signal, because an excessive noise component is present. This component can be eliminated through an integration of the frequency-limited input signal with an integration constant that is optimized to correspond to the usable signal to be detected.

It is the object of the invention to provide a generic method that permits a reliable detection of a usable signal containing the highest frequency components and a large noise component, in combination with a high instantaneous bandwidth.

SUMMARY OF THE INVENTION

The above object generally is achieved according to the present invention by a method for detecting a pulsed useful signal with a frequency-limited input signal being generated from an analog input signal through filtering, which is adapted to the useful signal to be detected, and the useful signal is determined from the frequency-limited input signal by an integration operation, Wherein: initially, a sequence or series of digital phase values with a specifiable word length is formed from the frequency-limited input signal by an amplitude-limiting phase/digital conversion; a sequence or series of first phase difference values is formed from each two respectively adjacent phase values; a sequence of second phase difference values is formed from respectively two first phase difference values with the aid of a difference formation; the associated absolute amounts for the second phase difference values are formed; and, the absolute amounts are supplied to a digital low pass filter with a predetermined integration time, which is adapted to the useful signal to be detected, with the useful signal to be detected being generated at the output of the low pass filter. Advantageous embodiments and/or modifications ensue from the further disclosure.

A first advantage is that the frequency-limited input signal is digitized, and the detection of the usable signal is purely digital.

A second advantage is that a reliable detection is possible, even with a minimal signal/noise ratio of 2 dB.

Further advantages ensue from the description below wherein the invention is described in detail by way of embodiments, with reference to schematic figures.

DETAILED DESCRIPTION OF THE PREFERRED EMBODIMENTS

In the invention, first an analog, frequency-limited input signal is generated in a known manner, preferably through band-pass filtering, and the medium frequency and bandwidth of this signal are adapted to the frequency of the usable signal to be detected. This analog, frequency-limited input signal is amplified in a predeterminable manner and digitized by a phase/digital converter that is known per se. This amplification and phase/digital conversion functions here as a limiting amplifier, because no information about the amplitude values of the frequency-limited input signal is required for the detection. The phase/digital conversion, which is performed at a predeterminable sampling rate, yields digital phase sampling values having a predeterminable word length, for example, 8 bits.

Figure 1:
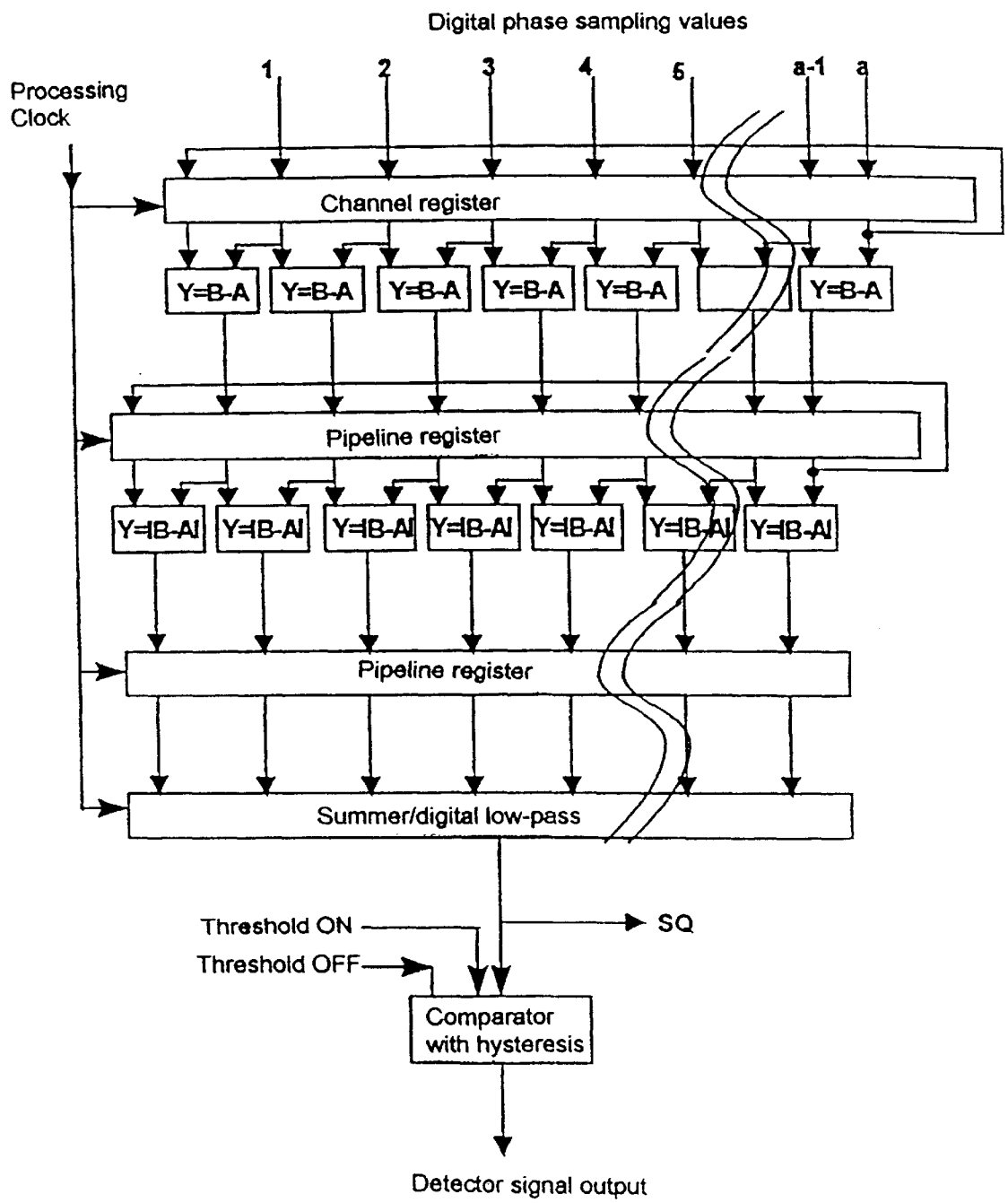
FIGS. 1 to 3 are schematic flow diagrams and
FIG. 4 is a graph for explaining the invention.

According to the embodiment shown in FIG. 1 for parallel processing, a predeterminable number a, for example (number?), of phase sampling values is always read into a channel register in parallel form, that is, simultaneously, by a processing clock. Afterward, two respectively adjacent phase sampling values, identified as A and B, are always subtracted by a subtraction circuit, so a series of associated, first phase differences Y=B−A results for all phase sampling values. These differences are placed in intermediate storage in a so-called pipeline register. The first phase differences present there as adjacent values are, as described, subtracted from one another again. In other words, two adjacent, first phase differences are always subtracted from one another and the absolute values are formed from the results. Thus, results a series of absolute values Y=|B−A| of second phase difference values. This series of absolute values Y=|B−A| is now kept in intermediate storage in a further pipeline register. The absolute values are then further processed by a digital summer and a digital low-pass filter. The output signal of the low-pass, filter which is also referred to as the signal-quality value SQ, is supplied to a comparator having hysteresis, for example, a digital window comparator. Two threshold-value signals, identified by Threshold_ON and Threshold_OFF, are also supplied to this comparator. A rectangular detector signal Output, which corresponds to the analog usable signal and can be further processed in digital form, is formed at the output of the comparator having hysteresis.

This type of detection is advantageously only dependent on the signal/noise ratio of the frequency-limited analog input signal. Other regulations of the amplification, and compensation of a temperature drift or the like, that are necessary in an analog signal are not necessary in the invention, because the amplitude information about the analog input signal having the most severe frequency limitation is advantageously not necessary.

Figure 4:
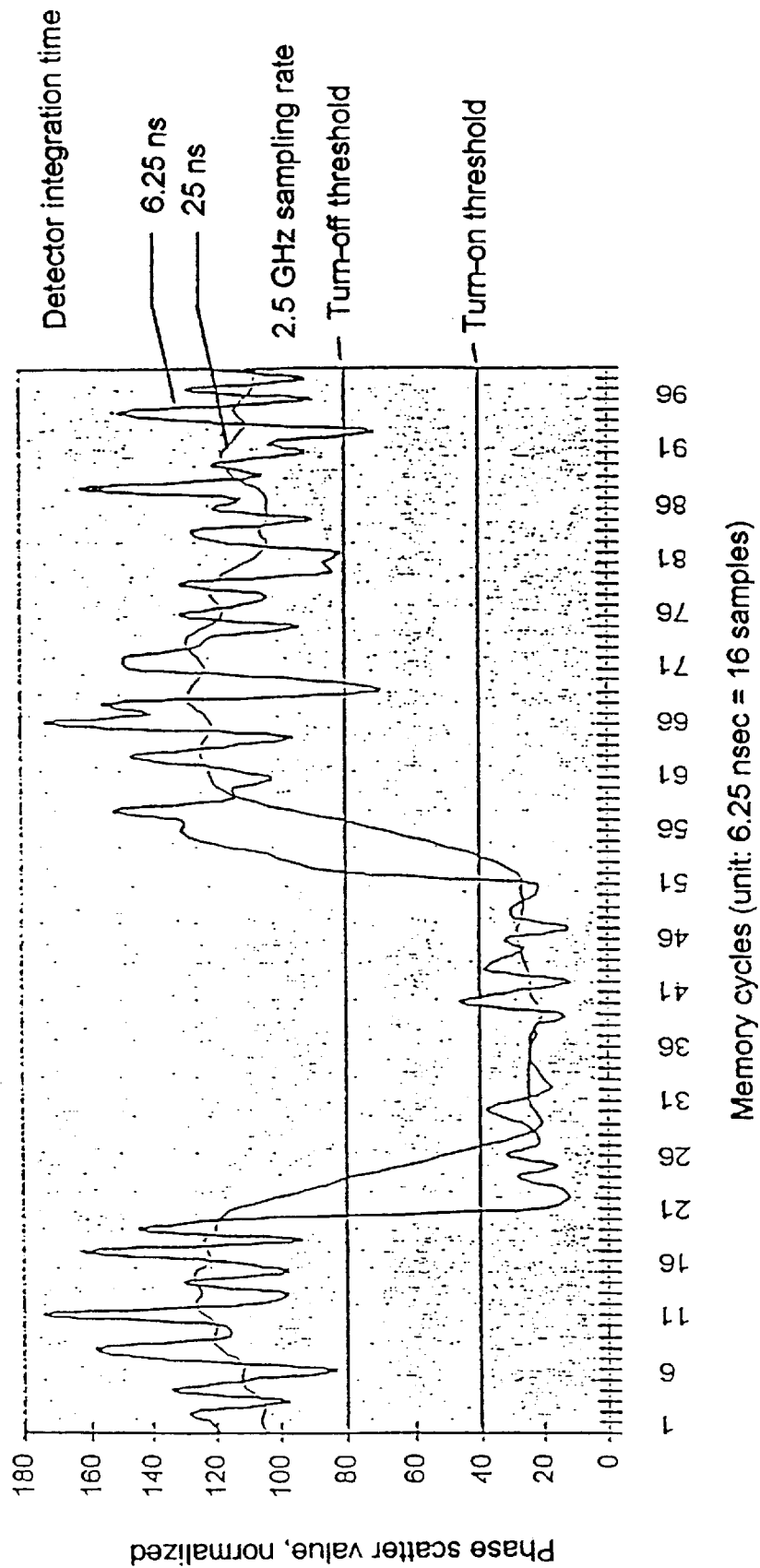

FIG. 4 shows an exemplary result of such a detection at the output of the digital low-pass filter. Here the associated analog input signal comprises (by way of example) a pulse-usable signal having a pulse width of about 200 nsec. The minimal measurable pulse width is limited by the integration time of the method, which is, for example, 6.25 nsec or 25 nsec in FIG. 4. A signal/noise ratio of about 10 dB is assumed. This type of analog (high-frequency) input signal is now sampled at a sampling rate of 2.5 GHz, that is, it is converted into digital phase values. Following the described detection, a signal whose ripple is a function of the selected integration time of the digital low-pass filter is formed at the output of the digital low-pass. FIG. 4 shows a first output signal, which is identified as 6.25 ns and possesses a considerable ripple, but a high time-measurement resolution or time-measurement precision, in the illustrated pulse. In this first output signal, an integration time of 6.25 nsec was selected in the digital low-pass filter. In contrast, the second output signal, identified as 25 ns, has a much smaller ripple, but a lower time-measurement resolution or time-measurement precision, in the illustrated pulse. In this second output signal, an integration time of 25 nsec was selected in the digital low-pass filter.

If a second output signal of this nature is to be converted into a corresponding digital output signal, in the comparator having hysteresis (FIG. 1), it is practical to select the threshold value Threshold_ON illustrated there, as well as Threshold_OFF, corresponding to the switching thresholds illustrated in FIG. 4: switch-on threshold or switch-off threshold.

In the arrangement illustrated in FIG. 1, the digital sampling values were always read in and processed in parallel in groups of a sampling values, with a being a predeterminable, whole, positive number. It is apparent that this type of method is only limited by the available maximum sampling rate in the phase/digital conversion, and permits a very fast detection. This is because the processing clock mentioned in FIG. 1, with which the register and the low-pass filter are clocked, is calculated according to the following formula:

Processing clock=sampling clock:a

Figure 2:
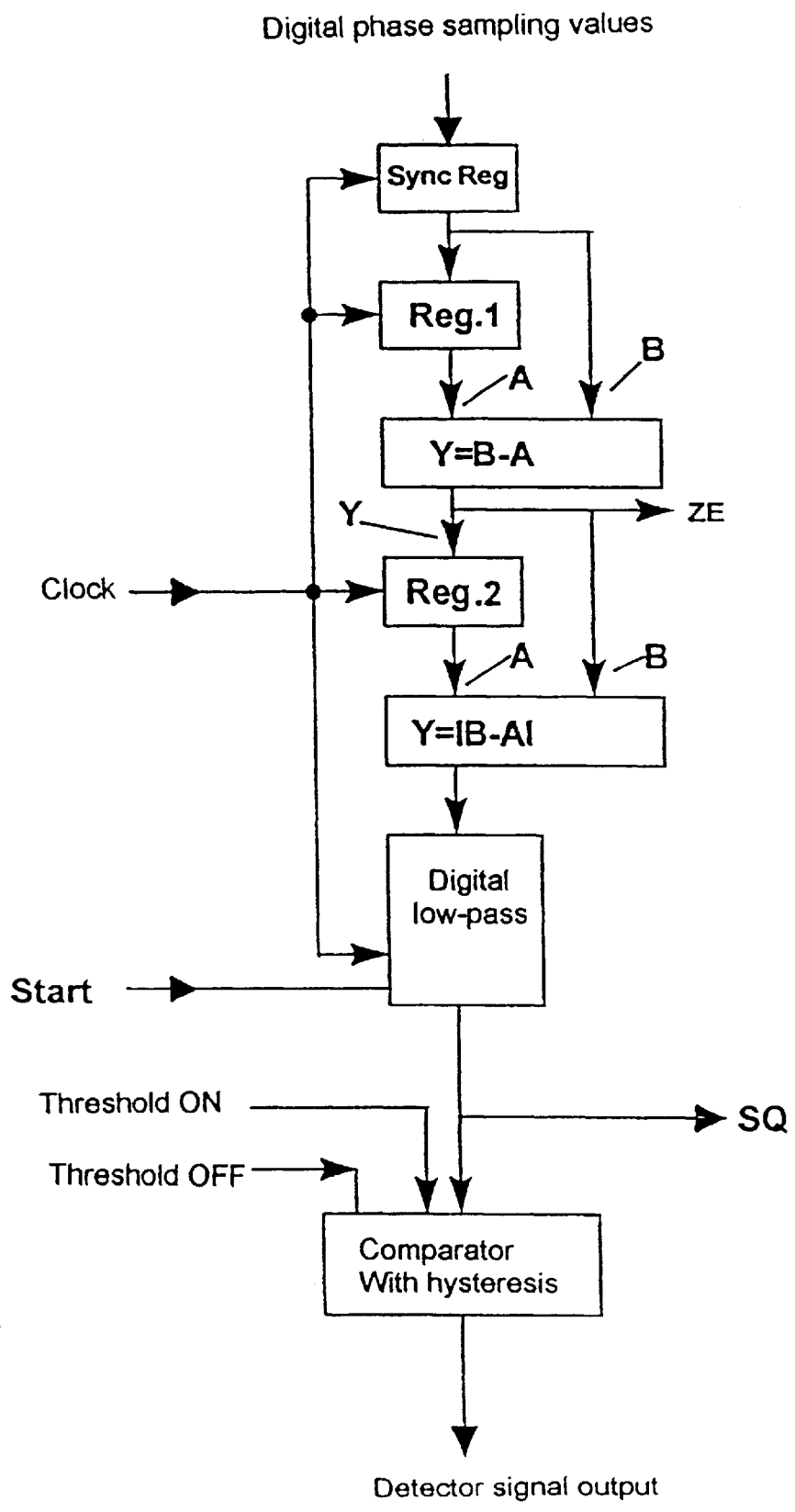

If the requirements placed on the processing speed are not very high, that is, if pulse-usable signals having a longer pulse duration and pulse pause are to be detected, a type of serial processing of the mentioned digital phase values is possible, corresponding to FIG. 2.

In accordance with FIG. 2, the digital phase values generated in the phase/digital conversion are read individually in serial fashion, that is, consecutively in time, into a synchronization register Sync_Reg, which is clocked with a clock that corresponds to the sampling clock. A first phase value A read into the synchronization register Sync_Reg in this manner is shifted into a first (memory) register Reg. 1 during the next (second) clock. During this clock pulse, pulsed a second phase value B is simultaneously read into the synchronization register Sync_Reg. In the next (third) clock, pulse the first phase value A is read out of the first register Reg. 1 and applied to a first input of a subtraction stage, represented by Y=B−A. During the same (third) clock, pulse the second phase value B stored in the synchronization register Sync_Reg is simultaneously read out and applied to a second input of the subtraction stage Y=B−A. At the same time, a new phase value is read into the synchronization register Sync_Reg. During the next (fourth) clock, pulse a first phase difference Y=B−A of the phase values A, B is formed in the subtraction stage Y=B−A, then read out and stored in a second register Reg. 2 in during the next (fifth) clock pulse. The series of first phase differences formed at the output of the subtraction stage can, if needed, be coupled out as an intermediate-result series ZE and used for frequency measurement, which will be explained in detail in conjunction with FIG. 3.

A further first phase difference Y=B−A is formed in the described manner in the next clock pulses. In the next clock pulse, the phase difference stored in the second register Reg. 2 is read out and applied to a first input A of a second subtraction stage Y=|B−A|. At the same time, the further formed phase difference is applied to a second input B of the second subtraction stage Y=|B−A|. The absolute value Y=|B−A| of the second phase differences is also formed in this second subtraction stage. The absolute value Y=|B−A| is supplied to a digital low-pass filter, described above, and then to a comparator, also described above, having hysteresis. A digital detector signal that can be processed further is formed at the output of the comparator as a function of the predeterminable switching thresholds Threshold_ON, Threshold_OFF.

The arrangements described in accordance with FIGS. 1 and 2 are also advantageously suited for determining the instantaneous frequency of the frequency-limited input signal. This is explained in detail in conjunction with FIG. 3.

Figure 3:
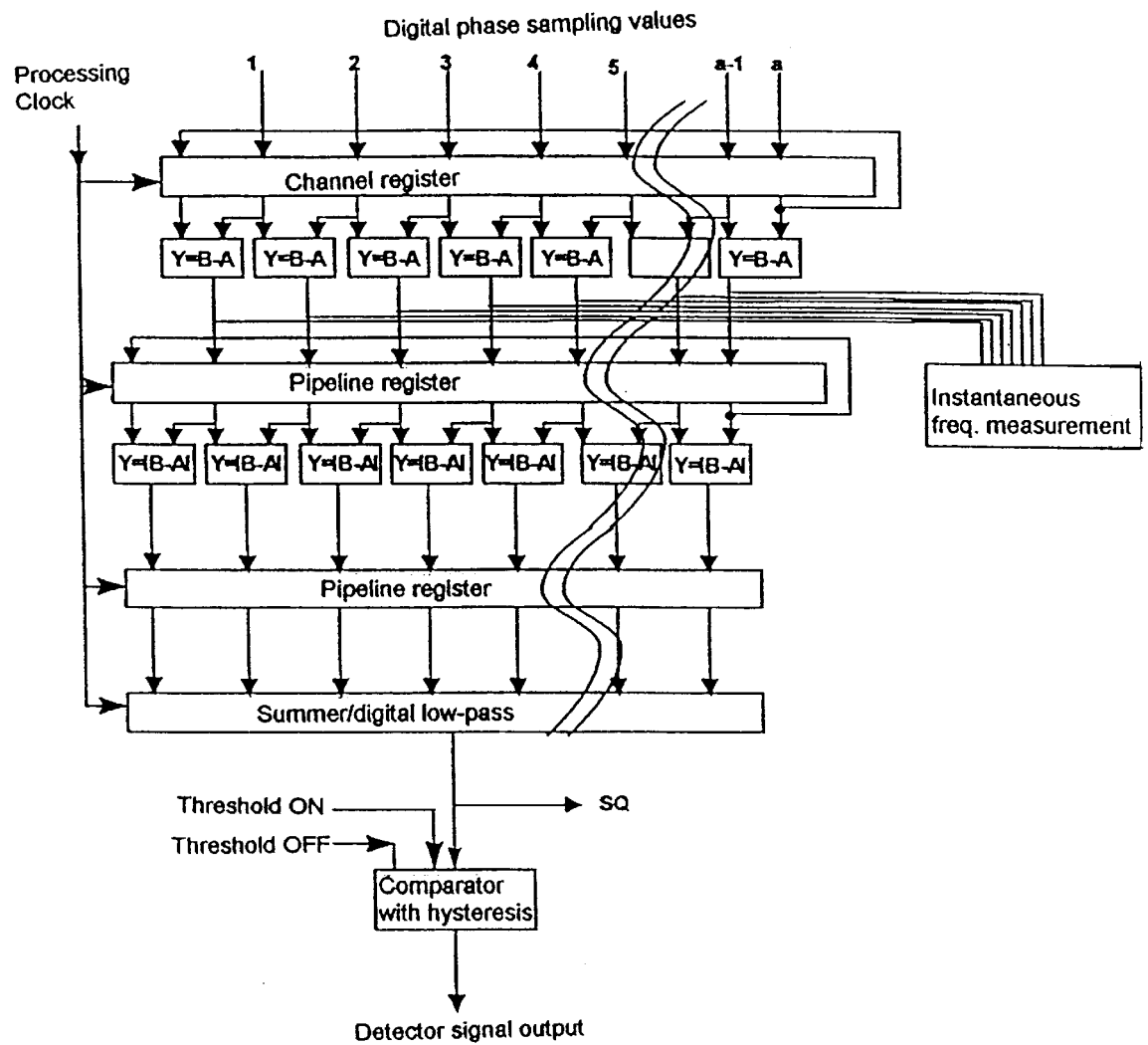

The only difference between FIG. 3 and FIG. 1 is that, in FIG. 3, an arrangement for measuring instantaneous frequency is additionally provided on the right side. This arrangement is described in the German Patent Application 197 44 691, which was not published before this document, and likewise employs differences of phase sampling values. The instantaneous frequency f(x) of the input signal is determined with the relationship $$f(x) = \frac{1}{2\Pi} \cdot \frac{\sum \Delta \rho_i}{\sum \Delta t_i}$$

where $\Delta \rho_i = \rho_n - \rho_m$ equals the difference between phase sampling values (for all n, m $\in$ pulses) and $\Delta t_i$ equals the difference between the corresponding time values.

Because differences represented by Y=B−A are also formed from phase sampling values in the arrangement according to FIGS. 1, 2 and 3, they can be supplied in parallel form (FIG. 3) or in serial form (FIG. 2, coupled out at the location represented by ZE) to the arrangement for instantaneous frequency measurement and evaluated there, if needed.

It is apparent that the described method can be applied in numerous ways, for example, as a circuit constructed from discrete components for the highest frequencies, for example the GHz range (clock), corresponding to FIGS. 1 and 3. Moreover, usable signals containing high frequencies can also be detected through the described parallel processing of the phase sampling values.

Because of the serial signal processing, the method described in conjunction with FIG. 2 is suitable for a lower frequency range of the usable signal. The frequency range of the arrangement according to FIG. 2 is essentially a function of the acceptable clock frequency of the used components.

It is also possible to realize the arrangements described in conjunction with FIGS. 1 through 3 essentially entirely as a data-processing program on a data-processing system. In this instance, the capability with respect to the usable signals to be detected is a function on the capability of the data-processing program and/or the data-processing system.

What is claimed is:

1. A method for detecting a pulsed usable signal, in which an input signal that is limited in frequency is formed from an analog input signal through a filtering that is adapted to the pulsed usable signal to be detected; and the pulsed usable signal is determined from the frequency-limited input signal by an integration process, with said method including:

first, forming a series of digital phase values having a predeterminable word length from the frequency-limited input signal through an amplitude-limiting phase/digital conversion;

forming a series of first phase difference values (Y=B−A) from each two respectively adjacent phase values;

forming a series of second phase differences values from two adjacent first phase differences values the series of first phase difference values through subtraction;

forming absolute values associated with the second phase difference values; and supplying the absolute values to a digital low-pass filter having a predeterminable integration time that is adapted to the pulsed usable signal to be detected, with the pulsed usable signal to be detected being formed at the output of the low-pass filter.

2. The method for detecting the pulsed usable signal according to claim 1, wherein the first phase difference values, the second difference values and the absolute values are formed by parallel signal processing.

3. The method for detecting the pulsed usable signal according to claim 1, wherein the first phase difference values, the second difference values and the absolute values are formed by serial signal processing.

4. The method for detecting the pulsed signal according to one of the foregoing claims, wherein the output signal of the digital low-pass filter is supplied to a comparator having hysteresis and predeterminable threshold values such that a detector signal that can be digitally processed and corresponds to the pulsed usable signal is formed at the output of the comparator.

5. The method for the pulsed signal according to claim 4, wherein an instantaneous frequency of the frequency-limited input signal is determined by an arrangement for measuring the instantaneous frequency, in which the series of the first phase difference values (Y=B−A) is determined by a function $$f(x) = 1/2\Pi \cdot \Sigma \Delta \rho_i / \Sigma \Delta t_i$$

where $\Delta \rho_i = \rho_n - \rho_m$ for all n, m $\in$ pulses.

* * * * *